Patented Apr. 13, 1954

2,675,390

UNITED STATES PATENT OFFICE 2,675,390

HYDROGENATION OF CYCLIC-COMPOUNDS

Edgar F. Rosenblatt, Montclair, N. J.

No Drawing. Application May 19, 1950,
Serial No. 163,083

4 Claims. (Cl. 260—313)

This invention relates to the catalytic hydrogenation of the ring of cyclic-compounds and is concerned in particular with the use of rhodium as a catalyst for this purpose.

It is generally considered to be more difficult to hydrogenate the ring of homocyclic and heterocyclic compounds than it is to hydrogenate unsaturated open chain compounds, nitro groups, aldehydes, ketones, etc. Ring hydrogenations usually require the use of highly active catalysts at elevated temperatures and moderately high pressures of hydrogen. For industrial processes involving the hydrogenation of ring compounds with gaseous hydrogen, nickel catalysts are the most commonly employed. Reactions with nickel catalysts must be maintained at temperatures above 125° C. and pressures of 100 pounds and over, depending in part upon the properties of the particular compound being hydrogenated. This need for maintaining elevated temperatures and pressures requires the use of relatively heavy, complex and expensive autoclaves. Furthermore, in many cases of ring hydrogenations, the yields obtained by using nickel catalysts are relatively low.

Platinum dioxide and platinum on carriers are the only catalysts heretofore known that will promote reactions of the type herein contemplated at room temperature and atmospheric pressure; however, these catalysts are relatively slow and are, therefore, not wholly satisfactory. Although palladium catalysts have found considerable use for hydrogenations of unsaturated open chain compounds, they are entirely unsuited for catalyzing ring hydrogenations. This difference in the types of reactions that may be catalyzed with palladium is so striking that hydrogenation with palladium catalysts has been used as a means for distinguishing the conjugated bond of rings from a double bond in open chain compounds. Other precious metals have found but little use as hydrogenation catalysts in industrial processes. These metals are rarer and, in most cases, more expensive than platinum and palladium, and before they may become commercially important, results obtained from their use must be substantially improved.

A general object of this invention is the provision of an improved and economical process for the ring hydrogenation of cyclic-compounds. Another object is to provide a process for ring hydrogenations that will proceed at accelerated rates under normal conditions of temperature and pressure. Further objects and various advantages of this invention will become apparent from the following description thereof, the essential characteristics being summarized in the claims.

It has now been discovered that ring compounds may be speedily hydrogenated with gaseous hydrogen to their corresponding saturated cyclic-compounds under normal conditions of temperature and pressure with the use of catalysts comprising rhodium supported on a suitable carrier. Reactions using rhodium catalysts have been found to be about 7 to 8 times faster than with platinum dioxide for the hydrogenation of cyclic-compounds, such as, for example, benzene, toluene, benzoic acid, phthalic acid, furane, and furoic acid. For compounds containing hydroxyl groups, like phenol, resorcinol and hydroquinone, the activity of the rhodium catalysts is in some cases from 16 to 30 times faster than with platinum catalysts.

For the purposes of this invention, the cyclic-compound and the hydrogen gas may be contacted with the supported rhodium catalyst in any suitable manner known to those skilled in the art. For example, the reactants may be continuously introduced into a reaction zone containing the rhodium catalyst. Also, the process may be effected in a batchwise manner. The product of hydrogenation is then recovered by filtering or in more complicated cases, by fractional distillation, by the use of selective solvents, or in any other well-known way. The cyclic-compound to be treated may, if desired, be dissolved or suspended in a suitable solvent. The amount of solvent does nuot influence the reaction except when causing extreme dilution.

The support for the rhodium may be in the form of pellets, granules or powder and it consists preferably of dehydrated alumina, in particular activated alumina, or activated carbon. Other carriers that may be used are dehydrated zirconium dioxide, chromium oxide, kieselguhr, bentonite, asbestos, dehydrated silica gel, and the like. However, for the purposes of this invention it has been found that if the carrier or support is alumina or activated carbon then the results obtained are far superior than if any of the other carriers are used.

The supported catalyst is prepared in any suitable manner, e. g. by treating the carrier with a solution of a suitable rhodium compound and then reducing such compound to rhodium metal. Care should be taken not to heat the carrier or the rhodium compound to excessive temperatures and, hence, thermal decomposition of the rhodium compound is preferably avoided.

The following examples set forth certain well defined instances of the application of this invention. They are, however, not to be considered as limitations thereof, since changes may be resorted to without departing from the spirit and scope of this invention.

Example 1

50 grams hydroquinone were suspended in 150 cc. of water. 5 grams of 5% rhodium on activated alumina catalyst was added. The mixture was shaken in a hydrogen atmosphere and the absorption of hydrogen was measured. The hydrogen absorption proceeded uniformly with an average speed of 20 minutes per liter to the end of the reaction.

Example 2

50 grams of phenol were suspended in 150 cc. of water. 5 grams of 5% rhodium on alumina catalyst was added. This mixture was shaken at room temperature and atmospheric pressure in an atmosphere of hydrogen and the reactions proceeded with a uniform absorption rate of 15 minutes per liter to the end of the reaction.

Example 3

25 cc. of pyrrole were dissolved in 100 cc. of glacial acetic acid. 5 grams of 5% rhodium on alumina was added. The hydrogenation proceeded extremely fast and was practically finished after 1½ hours.

Example 4

25 cc. of pyrrole was suspended in 100 cc. of water. 5 grams of 5% rhodium on alumina were added and the mixture was shaken at room temperature and atmospheric pressure. The hydrogen absorption proceeded in the beginning at a rate of 15 cc. per hour, which at the end slowed down somewhat, but was still very satisfactory.

Example 5

5 grams of benzoic acid was hydrogenated in 100 ml. acetic acid using 1 gram of 5% rhodium on alumina and the hydrogenation at room temperature and atmospheric pressure proceeded at the rate of 115 ml. hydrogen absorbed in five minutes to completion. Using 5% platinum on alumina, under the same conditions the hydrogen absorption was 35 ml. in five minutes.

Example 6

The hydrogenation of 0.5 cc. of diethyl phthalate in 100 ml. acetic acid with 1 gram of 5% rhodium on alumina required 15 minutes compared with more than 1 hour for 1 gram of 5% platinum on alumina.

Example 7

In the hydrogenation of 5 ml. benzene in 100 ml. acetic acid with 1 gram of 5% rhodium on alumina about 3 liters of hydrogen had been consumed in 30 minutes. Only 700 cc. of hydrogen was absorbed within this period using 1 gram of 5% platinum on alumina.

Example 8

1 gram furoic acid in 100 ml. water was hydrogenated using 1 gram of 5% rhodium on alumina at room temperature and atmospheric pressure. The hydrogen uptake was 200 ml. in 5 minutes as compared to 80 ml. in 5 minutes using 5% platinum on aluminum under the same conditions.

Example 9

3 grams of hydroquinone was hydrogenated in water using 500 mg. of 5% rhodium on carbon at room temperature and atmospheric pressure. The hydrogenation proceeded at the adsorption rate of 1 liter of hydrogen in approximately 35 minutes.

Although all of the above tests were performed under conditions of atmospheric pressure and room temperature, it is to be understood, of course, that the process of this invention may be carried out at elevated temperatures and pressures; and, as is well known, the rate of hydrogenation is accelerated when the temperatures and pressures are increased. However, it is preferred that the hydrogenation be carried out at room temperature and atmospheric pressure in view of the simplicity of the apparatus required and the highly acceptable results obtained.

By subjecting the products of the above hydrogenation reactions to distillation tests, refractive index determinations, as well as carbon and hydrogen analyses, it has been found that the original ring skeletons of the cyclic compounds treated were not ruptured during the reactions.

The process of this invention is especially important for the production of drugs and high grade chemicals which often comprise heterocyclic compounds, like pyridine, pyrrole, pyrimidine, etc. The hydrogenation of pyrroles at 200° C. over catalysts, such as Raney nickel, nickel on kieselguhr, and copper-chromium oxide proceeds slowly and the yields of pyrrolidine are relatively poor, amounting to about 50%. Compared with these results are the yields of practically 100% that are obtained by hydrogenating pyrroles in the presence of supported rhodium catalysts and at room temperature.

As stated above, the preferred catalyst, in the group specified, is that of rhodium on activated alumina or activated carbon. The catalysts described may also contain other catalytic metals, so long as the essential catalyst metal is rhodium and its characteristics are not interfered with.

What I claim is:

1. The process for the hydrogenation of an unsaturated cyclic compound to the corresponding saturated cyclic compound, which comprises contacting hydrogen with the unsaturated cyclic compound in the presence of a rhodium metal catalyst supported on a material selected from the group consisting of activated carbon and alumina, said hydrogenation being performed under conditions of normal room temperature and normal atmospheric pressure.

2. The process for the hydrogenation of an unsaturated cyclic compound to the corresponding saturated cyclic compound, which comprises contacting hydrogen with the unsaturated cyclic compound in the presence of a rhodium metal catalyst supported on alumina, said hydrogenation being performed under conditions of normal room temperature and normal atmospheric pressure.

3. The process for the ring hydrogenation of an aromatic compound whereby said compound becomes saturated, which comprises contacting hydrogen gas with the aromatic compound in the presence of a rhodium metal catalyst supported on a material selected from the group consisting of activated carbon and alumina, said hydrogenation being performed under conditions of normal room temperature and normal atmospheric pressure.

4. The process for the ring hydrogenation of an aromatic compound whereby said compound becomes saturated, which comprises contacting hydrogen gas and the aromatic compound in the presence of a rhodium metal catalyst supported on alumina, said hydrogenation being performed under conditions of normal room temperature and normal atmospheric pressure.

References Cited in the file of this patent

Zelenski et al., Ber. Deut. Chem. 58, 1298–1303 (1925).

Sabatier, Catalysis in Organic Chemistry, para. 581, page 205, 1923 Ed., D. Van Nostrand, New York, N. Y.

Zenghelis et al., Comptes Rend. 206, 682–3 (1938).